US012639238B2

(12) United States Patent
Mellquist et al.

(10) Patent No.: US 12,639,238 B2
(45) Date of Patent: May 26, 2026

(54) SMART I/O PERIPHERAL STORAGE-BASED STORAGE MESHES

(71) Applicant: HEWLETT PACKARD ENTERPRISE DEVELOPMENT LP, Spring, TX (US)

(72) Inventors: Peter Erik Mellquist, Roseville, CA (US); Montgomery C. McGraw, Magnolia, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 26 days.

(21) Appl. No.: 18/929,006

(22) Filed: Oct. 28, 2024

(65) Prior Publication Data

US 2026/0119418 A1 Apr. 30, 2026

(51) Int. Cl.
*G06F 13/16* (2006.01)
(52) U.S. Cl.
CPC ...... *G06F 13/1668* (2013.01); *G06F 2213/16* (2013.01)
(58) Field of Classification Search
CPC .......................... G06F 13/1668; G06F 2213/16
See application file for complete search history.

(56) References Cited

U.S. PATENT DOCUMENTS

| | | | | |
|---|---|---|---|---|
| 2015/0169231 A1* | 6/2015 | Kanigicherla | ........ | G06F 3/0611 |
| | | | | 710/5 |
| 2015/0334034 A1* | 11/2015 | Smedley | ............... | H04L 49/111 |
| | | | | 709/219 |
| 2023/0051825 A1* | 2/2023 | Chang | .................... | G06F 3/061 |
| 2023/0229341 A1* | 7/2023 | Chen | .................... | G06F 3/0655 |
| | | | | 711/113 |

OTHER PUBLICATIONS

"NVM Express Base Specification"; Revision 2.1; NVM Express, Inc.; Aug. 5, 2024; 707 pp.
"NVMe over PCIe, Transport Specification"; Revision 1.1; NVM Express, Inc.; Aug. 5, 2024; 44 pp.
"NVM Express RDMA Transport Specification"; Revision 1.1; NVM Express, Inc.; Aug. 5, 2024; 16 pp.
"NVM Express TCP Transport Specification"; Revision 1.1; NVM Express, Inc.; Aug. 5, 2024; 42 pp.

* cited by examiner

*Primary Examiner* — Zachary K Huson
(74) *Attorney, Agent, or Firm* — Trop, Pruner & Hu, P.C.

(57) ABSTRACT

A technique includes configuring, by a storage mesh controller, a plurality of computer platforms to associate the plurality of computer platforms with a software-defined storage mesh. The technique includes sharing storage among the plurality of computer platforms using the software-defined storage mesh. The sharing includes a first smart I/O peripheral of a first computer platform communicating with a second smart I/O peripheral of a second computer platform to share physical storage device of the second smart I/O peripheral with the first computer platform.

22 Claims, 8 Drawing Sheets

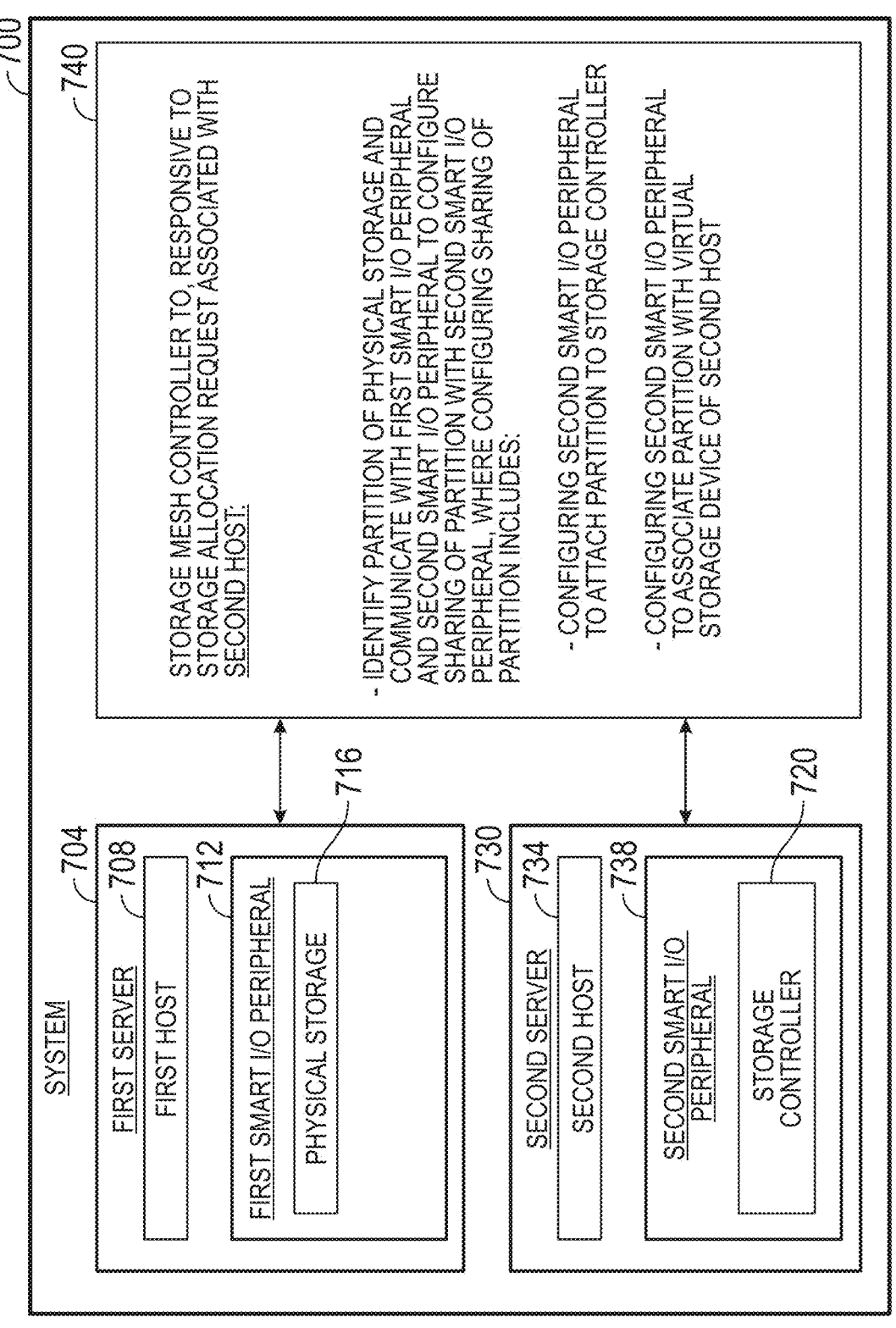

SYSTEM 700

FIRST SERVER 704

FIRST HOST 708

FIRST SMART I/O PERIPHERAL 712

PHYSICAL STORAGE 716

SECOND SERVER 730

SECOND HOST 734

SECOND SMART I/O PERIPHERAL 738

STORAGE CONTROLLER 720

STORAGE MESH CONTROLLER TO, RESPONSIVE TO STORAGE ALLOCATION REQUEST ASSOCIATED WITH SECOND HOST: 740

- IDENTIFY PARTITION OF PHYSICAL STORAGE AND COMMUNICATE WITH FIRST SMART I/O PERIPHERAL AND SECOND SMART I/O PERIPHERAL TO CONFIGURE SHARING OF PARTITION WITH SECOND SMART I/O PERIPHERAL, WHERE CONFIGURING SHARING OF PARTITION INCLUDES:

- CONFIGURING SECOND SMART I/O PERIPHERAL TO ATTACH PARTITION TO STORAGE CONTROLLER

- CONFIGURING SECOND SMART I/O PERIPHERAL TO ASSOCIATE PARTITION WITH VIRTUAL STORAGE DEVICE OF SECOND HOST

FIG. 7

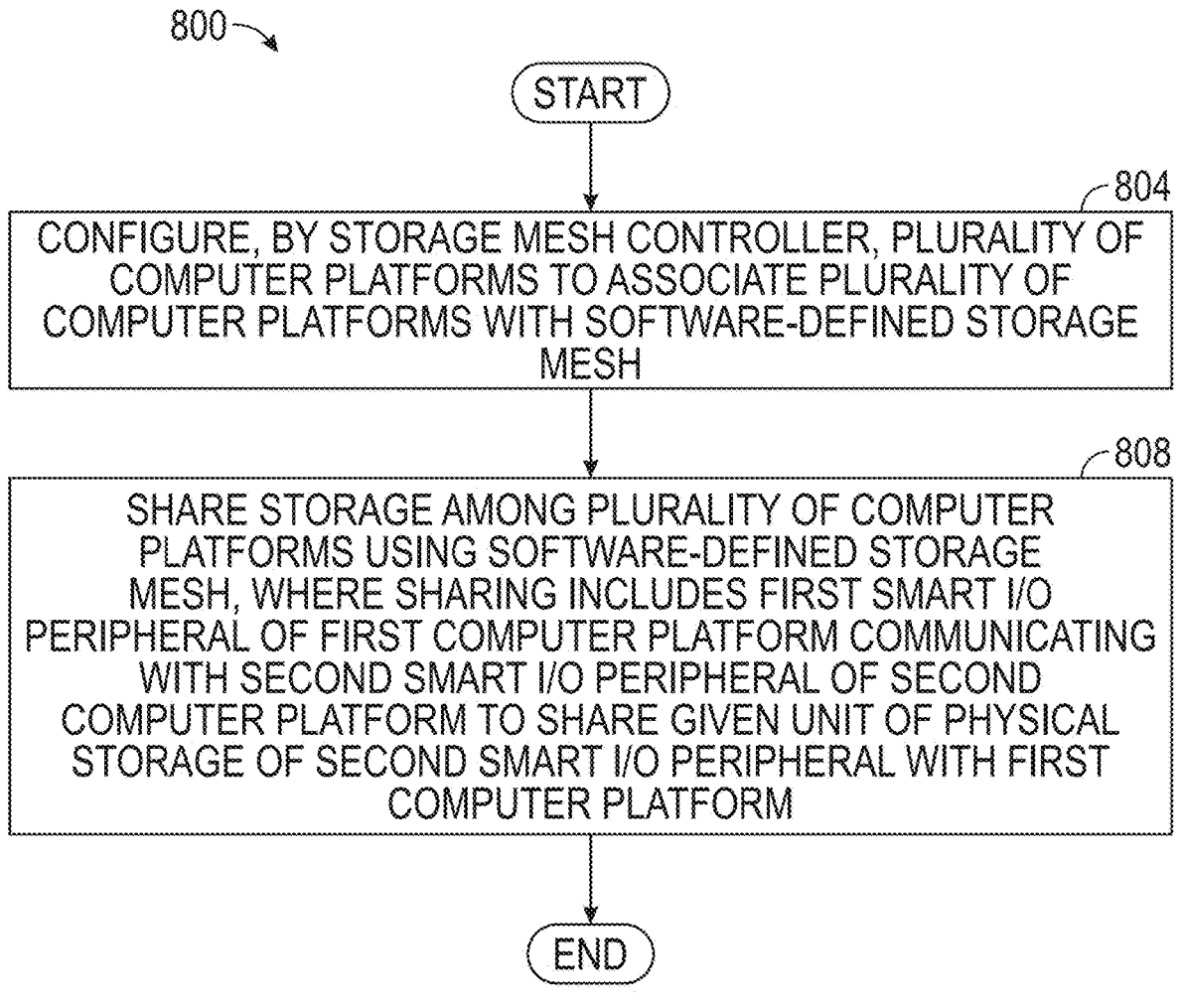

800

START

CONFIGURE, BY STORAGE MESH CONTROLLER, PLURALITY OF COMPUTER PLATFORMS TO ASSOCIATE PLURALITY OF COMPUTER PLATFORMS WITH SOFTWARE-DEFINED STORAGE MESH
804

SHARE STORAGE AMONG PLURALITY OF COMPUTER PLATFORMS USING SOFTWARE-DEFINED STORAGE MESH, WHERE SHARING INCLUDES FIRST SMART I/O PERIPHERAL OF FIRST COMPUTER PLATFORM COMMUNICATING WITH SECOND SMART I/O PERIPHERAL OF SECOND COMPUTER PLATFORM TO SHARE GIVEN UNIT OF PHYSICAL STORAGE OF SECOND SMART I/O PERIPHERAL WITH FIRST COMPUTER PLATFORM
808

END

FIG. 8

SMART I/O PERIPHERAL STORAGE-BASED STORAGE MESHES

BACKGROUND

A computer system may have a cloud native infrastructure in which compute nodes (e.g., servers) of the infrastructure host tenant workloads. Storage for the tenant workloads may be provided by a dedicated storage system, such as a local area network (LAN)-based storage system or a storage area network (SAN)-based storage system.

BRIEF DESCRIPTION OF THE DRAWINGS

FIG. 7 is a block diagram of a system that includes servers that share storage in an SDS mesh according to an example implementation.

FIG. 8 is a flow diagram depicting a technique to share storage among computer platforms using an SDS mesh.

DETAILED DESCRIPTION

Figure 1:
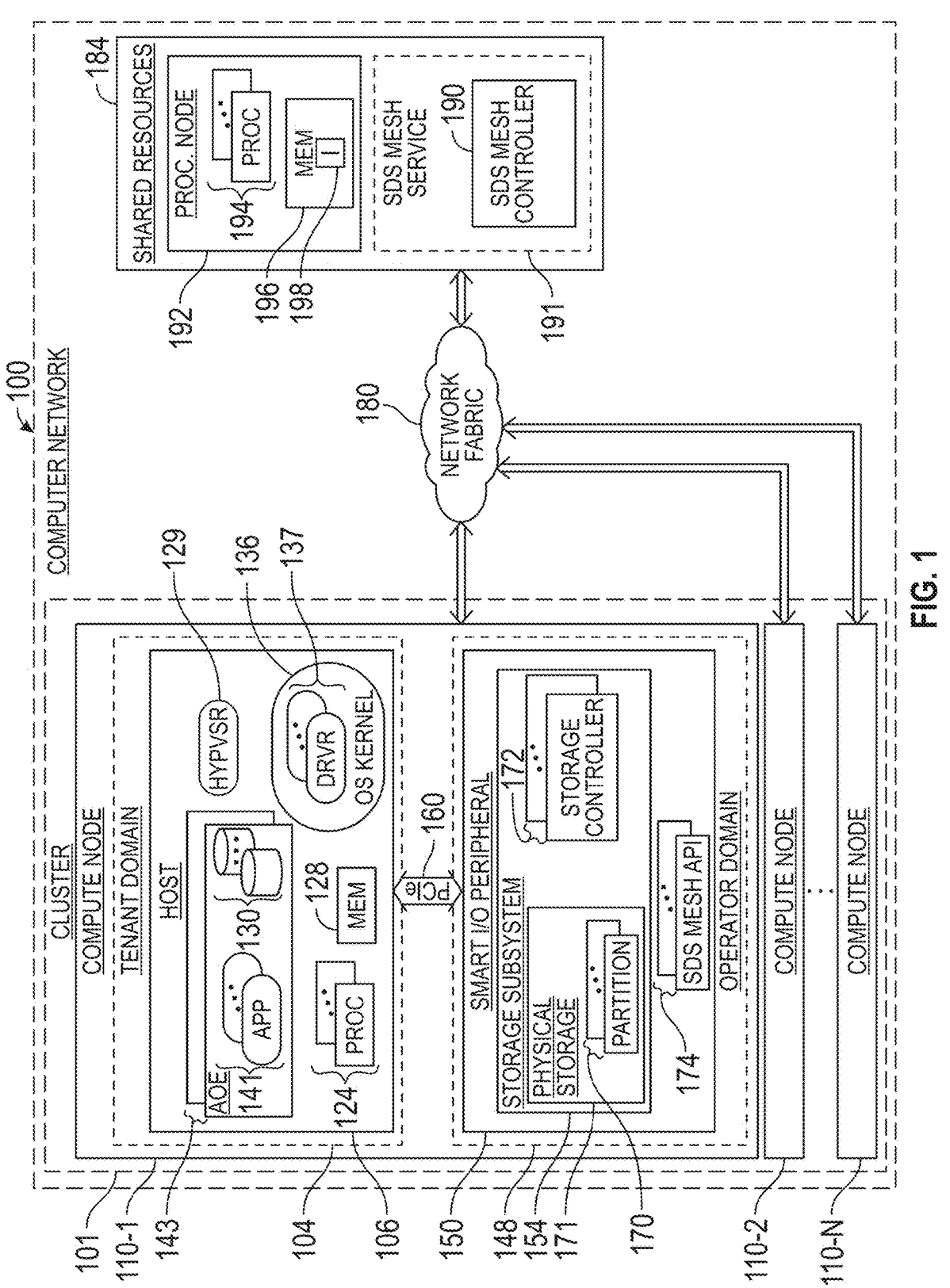
FIG. 1 is a block diagram of a computer network that includes compute nodes having smart input/output (I/O) peripherals that share storage as part of a software-defined storage (SDS) mesh, according to an example implementation.

In one approach, cloud native workloads rely on storage that is provided by a dedicated storage subsystem. A dedicated storage subsystem adds additional equipment, costs and complexity to a cloud native infrastructure.

In accordance with example implementations that are described herein, a cloud native infrastructure includes a cluster of compute nodes (e.g., servers) that host workloads. A given compute node of the cluster may have onboard storage that is not being fully utilized, resulting in the compute node having unused storage. In accordance with example implementations, a software-defined storage (SDS) mesh provides a solution to make this otherwise unused storage available to the workloads. The SDS mesh provides virtual storage devices (called "virtual drives" herein) for the workloads, and the SDS mesh orchestrates storage sharing among the compute nodes so that the underlying physical storage for the virtual drives is provided by otherwise unused compute node storage.

In the context that is used herein, a "storage mesh" refers to a collection of units of physical storage. The SDS mesh presents a logical abstraction (e.g., virtual drives) that corresponds to underlying physical storage. The SDS mesh, in accordance with example implementations, includes compute node-provided physical storage, virtual drives backed by the physical storage, and an abstraction layer that presents the virtual drives and allows sharing of the physical storage among the compute nodes. In accordance with example implementations, the abstraction layer may be a combination of hardware and software.

The compute nodes, in accordance with example implementations, include respective hosts that execute tenant application workloads. The tenant application workloads may be associated with multiple tenants. In an example, a host of a compute node is associated with a tenant domain of the cloud native infrastructure and provides one or multiple operating environments (e.g., virtual machines, orchestrated container clusters and/or bare metal environments) for the workloads. The tenants are oblivious to an operator (e.g., a cloud service operator), and the operator is isolated from tenants. The tenants are untrusted and unable to have any access to the compute node's physical infrastructure. Furthermore, in a multi-tenant environment tenants are oblivious to other tenants. A given application operating environment includes one or multiple virtual drives, which may be accessed by the workloads of the environment.

In accordance with example implementations, smart input/output (I/O) peripherals of the compute nodes provide the underlying physical storage for the SDS mesh. The smart I/O peripherals may also be referred to as "data processing units," or "DPUs;" or "infrastructure processing units," or "IPUs." In accordance with example implementations, the smart I/O peripherals are part of an operator domain, which is trusted from the perspective of the cloud operator. The host interfaces of the smart I/O peripherals provide tenant workload isolation barriers that isolate the tenant and cloud operator domains. In accordance with example implementations, the sharing, by the smart I/O peripherals, of physical storage with the SDS mesh is managed by the cloud operator, and the smart I/O peripherals present virtual drives for their respective hosts. As further described herein, a first smart I/O peripheral that contains target physical storage contributed to the SDS mesh is called a "target," and a second smart I/O peripheral that accesses the target physical storage is called a client, or "initiator."

An SDS mesh controller, in accordance with example implementations, is part of the operator domain and orchestrates the sharing of physical storage by the smart I/O peripherals. The orchestration includes the SDS mesh controller discovering available smart I/O peripheral-based physical storage for contribution to the SDS mesh. The orchestration further includes the SDS mesh controller allocating the discovered available physical storage to satisfy SDS mesh allocation requests that are submitted by or on behalf of the hosts. Each smart I/O peripheral includes SDS mesh application programming interfaces (APIs) that may be called by the SDS mesh controller to perform SDS mesh orchestration-related tasks.

For purposes of the SDS mesh controller discovering available physical storage for contribution to the SDS mesh, the SDS mesh controller may call SDS mesh APIs that indicate, or provide, storage offerings for smart I/O peripherals. In the context that is used herein, a "storage offering" is associated with a specific smart I/O peripheral and corresponds to a unit of physical storage that the smart I/O peripheral indicates as being available for contribution to the SDS mesh.

In an example, a storage offering may correspond to a particular partition of a storage subsystem (a subsystem corresponding to a non-volatile memory) of the smart I/O peripheral. In this context that is used herein, a "partition" refers to a part of the entire storage that is provided by a storage subsystem. In an example, the entire storage of a storage subsystem is logically organized as a collection of blocks that each have a defined block size, and a partition is a subset of the collection of blocks. The entire storage provided by a storage subsystem may be divided into one or multiple partitions. In an example, the entire storage provided by a storage subsystem may be divided into multiple partitions, with each partition corresponding to a unique range of logical block addresses. In an example, in Non-Volatile Memory Express (NVMe) terminology the term "namespace" is used to denote a partition.

A storage offering indicates a capacity, or size, of the available partition, as well as possibly indicates one or multiple other characteristics, or attributes (e.g., performance and privacy attributes), which are associated with the partition. In an example, the attributes of the storage offerings correspond to service level agreement (SLA) criteria, which are to be met by the operator. A given smart I/O peripheral may provide zero, one or multiple storage offerings, and the storage offering(s) provided by the smart I/O peripheral may change over time. Collectively, the partitions associated with the storage offerings form a pool of available physical storage that may be contributed to the SDS mesh.

The SDS mesh controller allocates storage from the pool of available physical storage in response to SDS mesh allocation requests. An SDS mesh allocation request specifies criteria for a virtual drive. More specifically, an SDS mesh allocation request corresponds to a particular host and specifies a capacity, or size, of the virtual drive. In addition to size, a storage allocation request may further specify other criteria (e.g., performance and privacy attributes) for the virtual drive. The SDS mesh controller, for a given SDS mesh allocation request, selects, from the pool of available physical storage, a partition (called a "target partition" herein) that corresponds to a particular storage offering and satisfies the criteria of the SDS mesh allocation request.

In addition to discovering storage offerings and allocating physical storage based on the storage offerings, the SDS mesh controller also calls SDS mesh APIs of the smart I/O peripherals for purposes of configuring the smart I/O peripherals to contribute physical storage to and access physical storage from the SDS mesh.

The underlying physical storage for a given virtual drive may be on a smart I/O peripheral of the same associated compute node, or the underlying physical storage may be located on a smart I/O peripheral that is located on another compute node. In an example, a virtual drive and the target partition that provides the underlying physical storage for the virtual drive are associated with the same compute node. The SDS mesh controller calls SDS mesh APIs of the smart I/O peripheral of the compute node to attach a storage controller of the smart I/O peripheral to the target partition and configure the smart I/O peripheral to present the virtual drive to the host of the compute node.

In another example, a virtual drive and the corresponding target partition are associated with different compute nodes of the cluster. The smart I/O peripheral of the compute node associated with the virtual drive is the initiator, and the smart I/O peripheral of the compute node associated with the target partition is the target. The SDS mesh controller calls SDS mesh APIs of the initiator smart I/O peripheral to attach a storage controller of the initiator smart I/O peripheral to the target partition, configure the initiator smart I/O peripheral to present the virtual drive to its host, and set up the initiator smart I/O peripheral to communicate with the target smart I/O peripheral using an over-fabric transport. The SDS mesh controller calls an SDS mesh API of the target smart I/O peripheral to set up the target smart I/O peripheral to communicate with the initiator smart I/O peripheral using the over-fabric transport.

Among its potential benefits, the SDS mesh solution takes advantage of existing smart I/O peripheral-based storage, which results in a smaller energy footprint than a dedicated storage system. Moreover, the SDS mesh solution avoids the costs and complexities associated with a dedicated storage system.

Referring to FIG. 1, as a more specific example, a computer network 100 includes a cluster N of compute nodes 110 (compute nodes 110-1, 110-2 to 110-N being depicted in FIG. 1). A "cluster," in this context, refers to a collection of compute nodes 110 that corresponds to an SDS mesh. A "compute node" refers to a computer platform, such as a server (e.g., an enclosure-based server, such as a blade server; a rack-based server, such as a density line (DL) server; or a tower server) or any other processor-based electronic device. The compute nodes 110 are interconnected by network fabric 180. In accordance with example implementations, the network fabric 180 may be associated with one or multiple types of communication networks, such as, in examples, Remote Direct Memory Access (RDMA) fabric, Fibre Channel fabric, InfiniBand fabric, Compute Express Link (CXL) fabric, dedicated management networks, local area networks (LANs), wide area networks (WANs), global networks (e.g., the Internet), wireless networks, or any combination thereof.

In accordance with example implementations, the compute nodes 110 are part of a cloud. In the context that is used herein, a "cloud" refers to a computer system that is associated with resources that can be scaled up and down on demand. In an example, a cloud that contains the cluster 101 may include additional compute nodes that are associated with one or multiple other clusters 101 and correspondingly, are associated with respective SDS meshes.

In an example, the compute nodes 110 are part of a private cloud that is associated with a business entity and is managed by a private cloud operator (e.g., an operator affiliated with the business entity). For this example, the compute nodes 110 may be on-premise resources that are located in the business entity's private datacenter or are located in leased space of a co-location datacenter; or some combination thereof. In another example, the compute nodes 110 are part of a hybrid cloud, and the compute nodes 110 are on-premise resources that are managed by a public cloud operator. In another example, the compute nodes 110 are part of a public cloud, which is managed by a public cloud operator.

FIG. 1 depicts components of a particular compute node 110-1. Although the architectures and component inventories of the compute nodes 110 may vary, in accordance with example implementations, each of the other compute nodes 110 of the cluster 101 includes components that are the same or similar to those of compute node 110-1. In accordance with example implementations, each compute nodes 110 has a cloud native architecture. The compute node 110 includes a host (e.g., a host 106 of compute node 110-1) that is part of a tenant domain (e.g., a tenant domain 104 of compute node 110-1). The compute node 110 further includes one or multiple smart I/O peripherals (e.g., a smart I/O peripheral 150 of the compute node 110-1) that are part of an operator domain (e.g., an operator domain 148 of the compute node 110-1). Smart I/O peripheral host interface(s) on each compute node 110 provide workload isolation barrier(s), which isolate the tenant and operator domains.

In the context used herein, a "host" refers to an entity that includes a collection of resources to support the execution of application processes. As depicted for the compute node 110-1, the host 106 includes such resources as a system memory 128, hardware processors 124 (e.g., central processing unit (CPU) cores and graphics processing unit (GPU) cores) and a host operating system kernel 136. The host 106 may also include one or multiple hypervisors 129 that each manages one or multiple guest virtual machines. The system memory 128 represents a collection of non-transitory storage devices, such as semiconductor storage devices, memristor-based storage devices, magnetic storage devices, phase change memory devices, a combination of devices of one or more of these storage technologies, or other devices. The system memory 128 may include a collection of memories of both volatile memory devices and non-volatile memory devices.

The host 106, in accordance with example implementations, provides one or multiple application operating environments 143 in which application processes 141 execute. In examples, the application operating environments 143 may be bare-metal environments as well as virtual environments, such as containers, orchestrated container clusters, virtual machines, or a combination of the foregoing environments. The application operating environments 143 host workloads. In this context, a "workload" refers to a collection of one or multiple application processes 141, such as a single application process 141 or multiple application processes 141 that operate under the same identity. In an example, the host 106 is associated with multiple tenants, and each tenant may be associated with one or multiple application operating environments 143.

A given application operating environment 143 may have one or multiple virtual drives 130 that are provided by the SDS mesh. For a given application operating environment 143, the virtual drives 130 of the environment 143 are mounted to one or multiple file systems that are associated with the environment 143. In an example, an application operating environment 143 is associated with a LINUX operating system, and a virtual drive 130 of the environment 143 corresponds to a drive identified in a "/dev" file system directory.

The smart I/O peripherals of the SDS mesh provide the underlying physical storage for the virtual drives. An SDS mesh controller 190 of a cloud operator is associated with the operator domain 148 and orchestrates the sharing of physical storage by the smart I/O peripherals of the cluster 101. As described further herein, this orchestration includes the SDS mesh controller 190 performing such tasks as allocating physical storage for virtual drives; managing a pool of available physical storage; and configuring the smart I/O peripherals to share storage using over-fabric communications. In this context, "over-fabric" communication refers to communication over the network fabric 180. The SDS mesh controller 190 performs the orchestration tasks as part of an SDS mesh service 191. In an example, the SDS mesh service 191 corresponds to an "as-a-Service" model. In an example, multiple instances of the SDS mesh controller 190 orchestrate smart I/O peripheral-based sharing for respective clusters 101.

In the context that is used herein, a "smart I/O peripheral" refers to a component of a computer platform, which provides one or multiple functions for a host of the computer platform, which, in legacy architectures were controlled by the host. A smart I/O peripheral may be also be referred to as a "data processing unit" (or "DPU") or an "infrastructure processing unit (or "IPU"). In general, a smart I/O peripheral is a hardware processing unit that has been assigned (e.g., programmed with) a certain personality. A smart I/O peripheral may provide one or multiple backend I/O services (or "host offloaded services) in accordance with its personality. The backend I/O services may be non-transparent services (e.g., hypervisor virtual switch offloading services) or transparent services (encryption services, compression services, packet processing services, overlay network access services and firewall-based network protection services). A smart I/O peripheral abstracts network interfaces and presents the interfaces to the host as one or multiple network interfaces controllers (or "NICs"). A smart I/O peripheral may communicate with the host over a collection of Peripheral Component Interconnect express (PCIe) links called a "PCIe bus," such as a PCIe bus 160 of the compute node 110-1, which connects the host 106 and the smart I/O peripheral 150.

The smart I/O peripherals include respective storage subsystems, such as a storage subsystem 154 of the smart I/O peripheral 150. As depicted in FIG. 1, the storage subsystem 154 includes physical storage 171. In this context, "physical storage" refers to collection of one or multiple components that store data, and the component(s) retain the data when the component(s) are unpowered. The physical storage subsystem 154 may be subdivided into partitions, such as the depicted partitions 170 of the physical storage 171. In an example, the physical storage 171 corresponds to a collection of non-volatile memory devices, such as NAND flash memory devices. In an example, a partition 170 corresponds to a collection of logical blocks and a corresponding collection of logical block addresses.

In another example, physical storage for a particular smart I/O peripheral may correspond to a magnetic storage drive.

The storage subsystem 154 includes one or multiple storage controllers 172. A storage controller 172 retrieves and executes commands for purposes of performing I/O transactions, such as operations to read data from the physical storage 171 and operations to write data to the physical storage 171. A storage controller, such as a storage controller 172, may be associated with, or "attached to," with one or multiple partitions so that the storage controller handles I/O transactions that involve the storage controller's attached partition(s). In an example, the storage subsystem 154 is an NVMe subsystem. In the NVMe nomenclature, the partitions, such as the partitions 170 of the smart I/O peripheral 150, are referred to as "namespaces," and an NVMe controller, such as a storage controller 172, may be attached to one or multiple namespaces.

In an example, for the compute node 110-1, the virtual drives 130 are virtual NVMe drives. A workload of the host 106 communicates commands and data with a virtual drive 130 according to a base NVMe protocol model in conjunction with an NVMe PCIe transport model. In an example, the base NVMe protocol model is described in the NVM Express (NVMe) Base Specification, Revision 2.1 (Aug. 5, 2024) and is published by NVM Express, Inc. In an example, the NVMe PCIe transport protocol model is described in the NVMe over PCIe Transport Specification, Revision 1.1 (Aug. 5, 2024) and is published by NVM Express, Inc.

A workload of the host 106 communicates with a virtual drive 130 using operating system kernel drivers. In an example, a workload may be associated with the host operating system kernel 136 and use drivers 137 (e.g., an NVMe device driver and a driver for the smart I/O peripheral 150) to perform I/O transactions with the virtual drive 130. In another example, a workload of the host 106 may be associated with a guest operating system kernel and use drivers of the guest operating system to perform I/O transactions with the virtual drive 130. In accordance with example implementations, an NVMe driver, on behalf of a workload, performs I/O transactions with the virtual drive 130 by writing messages to and reading messages from a portion of the system memory 128. This portion of the system memory 128 corresponds to memory-mapped registers of the smart I/O peripheral 150. The messages written to the portion of the system memory 128 contain data representing commands for the virtual drive 130, and the messages read from the portion of the system memory 128 contain data representing command statuses.

More specifically, in accordance with example implementations, the portion of the system memory 128 is associated with command submission queues and command completion queues for the virtual drive 130. In an example, a command submission queue contains requested commands for I/O operations (e.g., reads and writes), and a corresponding command completion queue contains statuses for the commands. The command submission queues and the command completion queues are associated with a particular storage controller 172 of the smart I/O peripheral 150. A storage controller 172 retrieves its commands from the corresponding command submission queues, executes the commands to perform I/O transactions with a particular attached partition, and provides the corresponding statuses for the command completion queues.

A particular partition of a smart I/O's physical storage, such as a partition 170 of the smart I/O peripheral 150, provides the underlying physical storage, or target partition, for a particular virtual drive. The virtual drive and the smart I/O peripheral containing the target partition may be or may not be associated with the same compute node 110. For a particular virtual drive whose target partition is on a remote smart I/O peripheral, two smart I/O peripherals are involved for I/O transactions involving the virtual drive: an initiator smart I/O peripheral and a target smart I/O peripheral. A given smart I/O peripheral, depending on the location of the virtual drive and the target partition, may either be an initiator or a target. Moreover, a given smart I/O peripheral may be both an initiator and a target for different respective virtual drives of the cluster 101. The ability of each smart I/O peripheral to act as both a target and initiator, allows the formation of a storage mesh. Consequentially, each compute node 110 can connect to other compute nodes 110 of the cluster 101 as both an initiator and a target.

In an example, for the compute node 110-1, the underlying physical storage for a virtual drive 130 corresponds to a particular target partition 170. A storage controller 172 that is attached to the target partition 170 executes the commands that are placed in the submission queues of the system memory 128 for the virtual drive 130 for purposes of performing I/O transactions with the target partition 170, and the storage controller 172 updates command statuses in completion queues of the system memory 128.

In another example, for the compute node 110-1, the underlying physical storage for a virtual drive 130 corresponds to a target partition that is located on a target smart I/O peripheral that is located on another compute node 110 of the cluster 101. For this example, the smart I/O peripheral 150 is the initiator. A storage controller 172 that is attached to the target partition uses an over-fabric transport to access the target partition. The use of the over-fabric transport involves the initiator smart I/O peripheral 150 communicating with the target smart I/O peripheral. The over-fabric communication between the initiator and target smart I/O peripherals, in accordance with example implementations, corresponds to an NVMe base protocol model in conjunction with an over-fabric NVMe transport model. In an example, the over-fabric NVMe transport model is a Transport Control Protocol (TCP) transport model, such as the model described in the NVM Express (NVMe) TCP Transport Specification, Revision 1.1 (Aug. 5, 2024), which is published by NVM Express, Inc. In another example, the over-fabric NVMe transport model is a remote memory access (RDMA) transport model, such as the model described in the NVM Express (NVMe) RDMA Transport Specification, Revision 1.1 (Aug. 5, 2024), which is published by NVM Express, Inc. In other examples, the over-fabric transport model is a Fibre Channel transport model or an Infiniband transport model. In the context that is used herein, "RDMA" refers to any of the multiple forms of RDMA, including RDMA over an Infiniband network, RDMA over TCP and RDMA over Converged Ethernet (ROCe).

The SDS mesh controller 190, in accordance with example implementations, orchestrates the sharing of physical storage by the smart I/O peripherals. This orchestration includes the SDS mesh controller 190 discovering available smart I/O peripheral-based physical storage for contribution to the SDS mesh, and the orchestration includes the SDS mesh controller 190 allocating the discovered available physical storage responsive to SDS mesh allocation requests. For purposes of performing orchestration-related tasks, the SDS mesh controller 190 calls SDS APIs of the smart I/O peripherals, such as the SDS mesh APIs 174 of the smart I/O peripheral 150. In the context that is used herein, an "API" refers to a collection of software components, which collectively provide one or multiple functions, operations or actions. In accordance with example implementations, the SDS mesh APIs allow the SDS mesh controller 190 to perform lifecycle management of storage for the SDS mesh according to a Software-as-a-Service (Saas) model. In an example, the SaaS model corresponds to a variety of services, such as a Create Storage service (e.g., a service to create a virtual storage device), an Update Storage Service (e.g., a service to change the storage size of a virtual storage device), and a Delete Storage service (e.g., a service to delete a virtual storage device).

In accordance with example implementations, a storage mesh API and its associated action handler provide a mechanism for the corresponding smart I/O peripheral to indicate, to the SDS mesh controller 190, one or multiple storage offerings for the smart I/O peripheral. A storage offering, in accordance with example implementations, includes data that represents a particular partition that the smart I/O peripheral offers to share with the SDS mesh, and the storage offering includes data that represents, one or multiple attributes, or characteristics, of the offered partition. In an example, a storage offering includes data that represents a capacity of the partition (e.g., a capacity in terms of a number of bytes or a logical block size). In an example, a storage offering includes data that represents one or multiple Quality of Service (QoS) characteristics of the partition.

For example, a QoS characteristic may be in terms of an expected performance. In an example, a storage offering may represent a QoS characteristic in terms of an input/output operations per second (IOPs), such as a maximum IOPs (e.g. a maximum IOPs for reads, a maximum IOPs for writes or a maximum IOPs for both reads and writes) that can be supported for the partition.

In another example, a QoS characteristic may represent a maximum throughput, which is the maximum rate of data transfer that can be supported for the partition. In other examples, a QoS characteristic may represent a maximum throughput for writes, a maximum throughput for reads or a maximum throughput for both writes and reads. In another example, a QoS characteristic may represent a minimum latency that can be supported for the partition. In other examples, a QoS characteristic may represent an availability (e.g., a maximum percentage of time that the partition is available) or a reliability (e.g., a maximum likelihood that the partition meets the characteristics specified by the storage offering). QoS can be achieved by rate limiting the initiator and/or rate limiting the network bandwidth for over-fabric communications.

In another example, a storage offering may indicate a privacy-related capability associated with the partition, such as whether or not the data stored in the partition is encrypted, a specific cipher (e.g., an Advanced Encryption Standard (AES) cipher) that is used for the partition or whether data stored in the partition is anonymized. In another example, a storage offering may indicate a security-related capability for the partition, such as indicate a particular access control, or indicate a particular security intrusion prevention or detection control. In another example, a storage offering may specify the capability of an Internet Protocol Security (IPSEC) suite for over-fabric communications involving the partition.

In another example, a storage offering may specify a class of storage associated with a partition, such as specifying that the partition is tier 1, tier 2 or tier 3 storage.

In an example, one or multiple characteristics of a storage offering may be classified as belonging to multiple attribute categories. For example, a performance-related characteristic may be categorized as being both related to QoS and also be an SLA attribute.

In accordance with some implementations, a storage offering is associated with data that is organized as a collection of key-value pair entries. Each key-value entry corresponds to a characteristic, or attribute, of the storage offering.

The key of a key-value entry identifies the attribute category, and the value of the entry represents, as examples, an amount, name, rate, or Boolean state associated with the attribute category. In an example, the key-value pair entries may be organized in accordance with a certain format, such as a JavaScript Object Notation (JSON) format or a Yet Another Markup Language (YAML) format. In accordance with further implementations, a storage offering may be associated with data that is organized in a format (e.g., a table or a tree) other than a collection of key-value pair entries.

SDS mesh allocation requests may be submitted by, or on behalf of, hosts of the cluster 101. In an example, for the compute node 110-1, an SDS mesh allocation may correspond to a request for a virtual drive 130 for a particular application operating environment 143. An SDS mesh allocation request represents a collection of declarative intents (called "criteria" herein) for a virtual drive. In an example, for the compute node 110-1, an application process 141 may submit an SDS mesh allocation request (e.g., a representation state transfer (REST) API request or gPRC API request) to a uniform resource locator (URL) associated with the SDS mesh service 191 for purposes of creating a virtual drive 130. In another example, a human user may, through a web browser on a client device, submit an SDS mesh allocation via an API call to a URL associated with the SDS mesh service 191 for purposes of creating a virtual drive for a particular host and application operating environment of the cluster 101.

An SDS mesh allocation request may specify any of a number of criteria for a virtual drive. Moreover, the SDS mesh allocation request, in accordance with example implementations, is associated with data that represents key-value pair entries. Similar to a storage offering, the key-value pair entries for an SDS mesh allocation request may be organized in a certain format, such as a JSON format or a YAML format.

In an example, an SDS mesh allocation request may specify a certain capacity, or size, for the virtual drive. In an example, an SDS mesh allocation request may specify one or multiple QoS criteria for the virtual drive, such as a minimum IOPs for all transactions, a minimum IOPs for writes or a minimum IOPs for reads. In another example, an SDS mesh allocation request may specify a minimum throughput for the virtual drive. In another example, an SDS mesh allocation request may specify a maximum latency for the virtual drive. In other examples, an SDS mesh allocation request may specify a minimum availability or a minimum reliability for the virtual drive.

In another example, an SDS mesh allocation request specifies a privacy-related criteria, such as whether or not the data stored in the virtual drive (and underlying physical drive(s)) is to be encrypted, a specific encryption cipher to use, whether or not multiple tenants can access the virtual drive, whether data stored in the virtual drive is to be anonymized, or a combination of the foregoing. In another example, an SDS mesh allocation request may specify a security-related characteristic for the virtual drive, such as a particular access control, or a particular security intrusion prevention or detection control. In another example, an SDS mesh allocation request specifies the use of the IPSEC suite for over-fabric communications associated with the virtual drive. As can be appreciated, one or multiple of the criteria that are set forth in an SDS mesh allocation request may be classified as belonging to multiple criteria categories (e.g., one or multiple of QoS, SLA, performance, privacy, security, capacity, as well as other categories).

The SDS mesh controller 190 calls the respective SDS mesh APIs of the smart I/O peripherals to discover a pool of available physical storage for the SDS mesh. In an example, the SDS mesh controller 190 may maintain a collection of metadata representing characteristics of each storage offering in the pool of available physical storage. In an example, the metadata identifies, for each storage offering, a compute node ID, a storage controller ID, a partition path and the attributes of the storage offering. For a particular SDS mesh allocation request, the SDS mesh controller 190 selects a storage offering from the pool of available physical storage, which has attributes that satisfy, or meet, the criteria that are specified by the SDS mesh allocation request.

The SDS mesh controller 190 may apply any of a number of selection criteria for purposes of selecting a storage offering from a group of candidate storage offerings that satisfy the criteria of an SDS mesh allocation request. In accordance with example implementations, the SDS mesh controller 190 applies a brokering algorithm to matching an SDS mesh allocation request to the storage offering that can best meet the request. In an example, the SDS mesh controller 190 identifies a group of candidate storage offerings that meet the SDS mesh allocation request's criteria and selects the candidate storage offering that is the closest fit to the criteria for purposes of avoiding over-provisioning. In another example, the SDS mesh controller prefers a candidate storage offering that places the target partition on the same compute node 110 as the virtual drive. In another example, the SDS mesh controller 190 may apply a user-specified policy that specifies one or multiple preferences for selecting a particular storage offering from multiple storage offerings that satisfy the SDS mesh allocation request.

The SDS mesh controller 190, after selecting a storage offering, may next take actions to create a target partition that conforms to the capacity requested by the request. In an example, the SDS mesh allocation request is for a virtual drive of 1 gigabytes (GB), and the selected storage offering corresponds to a particular partition of 10 GB in size. The SDS mesh controller 190 may, in this example, carve out 1 GB from the partition corresponding to the storage offering by reducing the size of the partition to 9 GB and creating, from the original partition, a target partition that is 1 GB in size. In another example, a selected storage offering corresponds to the capacity, or size, that is specified by the SDS mesh allocation request, and the SDS mesh controller 190 does not take any action to create a target partition other than designate the partition of the storage offering as being the target partition.

For a target partition that is located on the same compute node 110 as the host, the SDS mesh controller 190 configures the smart I/O peripheral of the compute node 110 by calling one or multiple SDS mesh APIs of the smart I/O peripheral. In an example, for the compute node 110-1, the configuration includes the SDS mesh controller 190 calling an SDS mesh API 174 to attach a target partition (e.g., a target partition corresponding to one of the partitions 170) to a storage controller 172. In an example, the configuration includes the SDS mesh controller 190 calling an SDS mesh API 174 to configure the smart I/O peripheral 150 to associate the target partition with the virtual drive 130. In an example, the configuration includes the SDS mesh controller 190 calling an SDS mesh API 174 to configure the smart I/O peripheral 150 to present the virtual drive 130 to the host 106.

For a target partition that is accessed via an over-fabric transport, the SDS mesh controller 190 calls one or multiple SDS mesh APIs to configure the target and initiator smart I/O peripherals. In an example, the smart I/O peripheral 150 of the compute node 110-1 is the initiator, and a smart I/O peripheral on another compute node 110 is the target. In an example, the configuration for the initiator smart I/O peripheral 150 includes the SDS mesh controller 190 calling an SDS mesh API 174 to attach a target partition to a storage controller 172. In an example, the configuration includes the SDS mesh controller 190 calling an SDS mesh API 174 to configure the initiator smart I/O peripheral 150 to associate the target partition with the virtual drive 130 and present the virtual drive 130 to the host 106. In an example, the configuration includes the SDS mesh controller 190 calling SDS mesh APIs 174 to set up the initiator smart I/O peripheral 150 and the target smart I/O peripheral to use an over-fabric transport.

Among the other features of the computer network 100, in accordance with example implementations, the SDS mesh controller 190 is hosted on shared resources 184 (e.g., resources corresponding to a public cloud). The shared resources 184 include one or multiple processing nodes 192. Each processing node 192, in accordance with example implementations, includes one or multiple hardware processors 194. In an example, one or multiple hardware processors 194, on one or multiple processing nodes 192 may execute hardware processor-readable instructions, such as machine-readable instructions 198 that are stored in a memory 196, for purposes of providing one or multiple instances of the SDS mesh controller 190. In accordance with further implementations, a hardware processor 194 may be a dedicated hardware circuit that does not execute machine-executable instructions, such as an application specific integrated circuit (ASIC), field programmable gate array (FPGA), programmable logic device, programmable logic device (PLD), or other hardware dedicated to providing one or multiple functions for the SDS mesh controller 190. In accordance with further implementations, a hardware processor 194 may be a combination of a device that both executes machine-executable instructions and a dedicated hardware circuit that does not execute machine-executable instructions for purposes of providing one or multiple functions for the SDS mesh controller 190.

Figure 2:
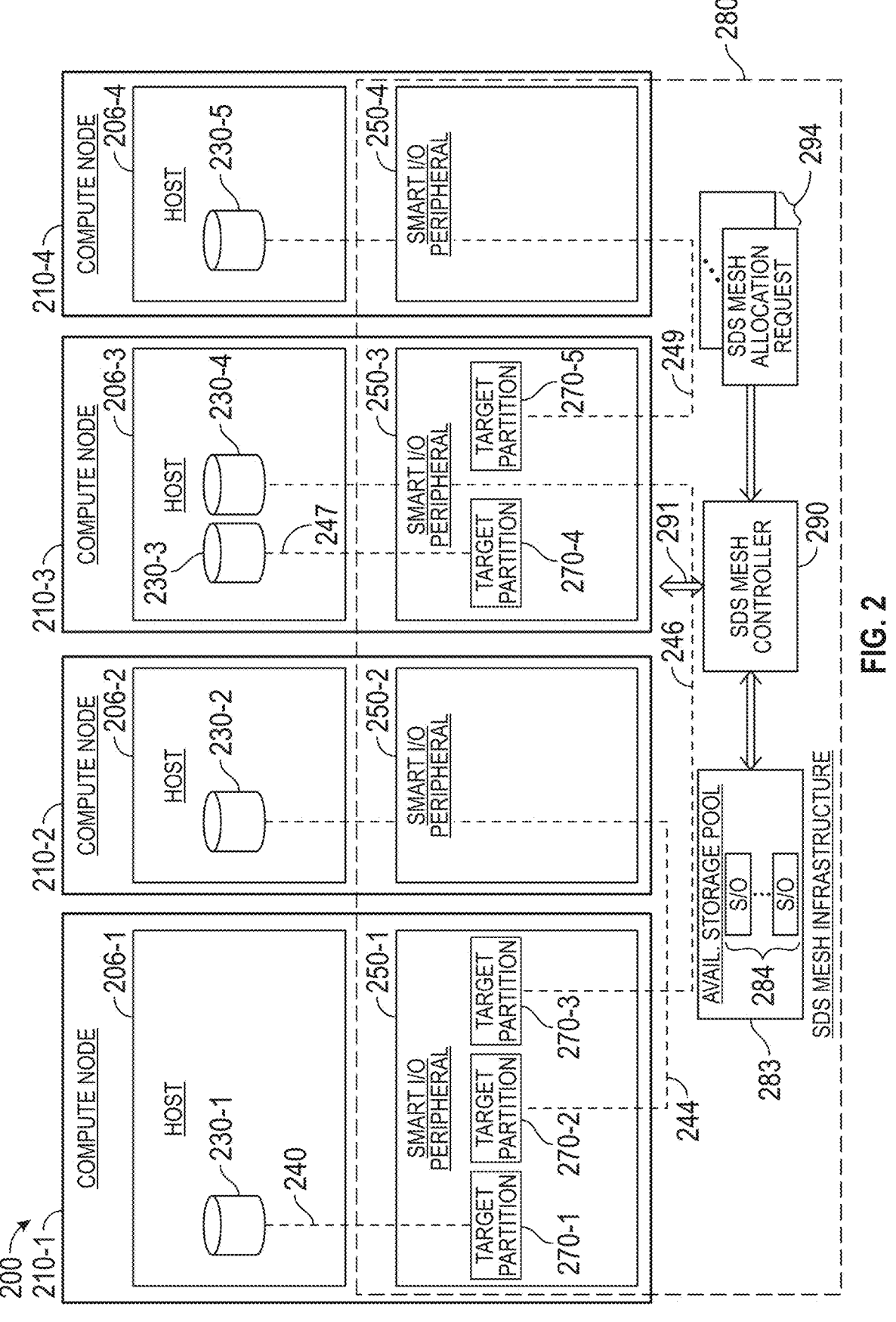
FIG. 2 is an illustration of an SDS mesh infrastructure according to an example implementation.

FIG. 2 is an illustration 200 of an SDS mesh infrastructure 280 that corresponds to four example virtual drives 230 (i.e., virtual drives 230-1, 230-2, 230-3 and 230-4). The SDS mesh infrastructure 280 is associated with a cluster that includes four example compute nodes 210 (i.e., compute nodes 210-1, 210-2, 210-3 and 210-4). Each compute node 210 includes a smart I/O peripheral 250. More specifically, as depicted in FIG. 2, the compute nodes 210-1, 210-2, 210-3 and 210-4 include the smart I/O peripherals 250-1, 250-2, 250-3 and 250-4, respectively. The SDS mesh infrastructure 280 further includes an SDS mesh controller 290. The compute node 110, SDS mesh controller 190 and smart I/O peripheral 150 of FIG. 1 are examples of the compute node 210, SDS mesh controller 290 and smart I/O peripheral 250, respectively.

For the example depicted in FIG. 2, target partitions 270 correspond to units of physical storage, which are contributed to the SDS mesh. More specifically, the smart I/O peripheral 250-1 includes three target partitions 270-1, 270-2 and 270-3; and the smart I/O peripheral 250-3 includes two target partitions 270-4 and 270-5. The smart I/O peripherals 250-2 and 250-4, for the example that is depicted in FIG. 2, do not contribute physical storage to the SDS mesh.

The target partitions 270-1, 270-2 and 270-3 of the compute node 210-1 share storage with three compute nodes 210. More specifically, a host 206-1 of the compute node 210-1 has a virtual drive 230-1. As depicted by association path 240, the underlying physical storage for the virtual drive 230-1 corresponds to the target partition 270-1. The other target partitions 270-2 and 270-3 of the compute node 210-1 provide underlying physical storage for virtual drives that are located on remote compute nodes 210. More specifically, the target partition 270-2, as depicted by association path 244, provides the underlying physical storage for a virtual drive 230-2 of a host 206-2 of the compute node 210-2. Therefore, for the virtual drive 230-2, the smart I/O peripheral 250-1 is a target, and the smart I/O peripheral 250-2 is an initiator. The target partition 270-3 of the compute node 210-1, as depicted by association path 246, provides the underlying physical storage associated with a virtual drive 230-4 of a host 206-3 of the compute node 210-3. Therefore, for the virtual drive 230-4, the smart I/O peripheral 250-1 is a target, and the smart I/O peripheral 250-3 is an initiator.

For the compute node 210-3, the target partition 270-4 of the smart I/O peripheral 250-3, as depicted by association path 247, provides the underlying physical storage corresponding to a virtual drive 230-3 of the compute node's host 206-3. Another target partition 270-5 of the smart I/O peripheral 250-3, as depicted by association path 249, provides the underlying physical storage associated with a virtual drive 230-5 of a host 206-4 of the compute node 210-4. Therefore, for the virtual drive 230-5, the smart I/O peripheral 250-3 is a target, and the smart I/O peripheral 250-4 is an initiator.

Figure 4:
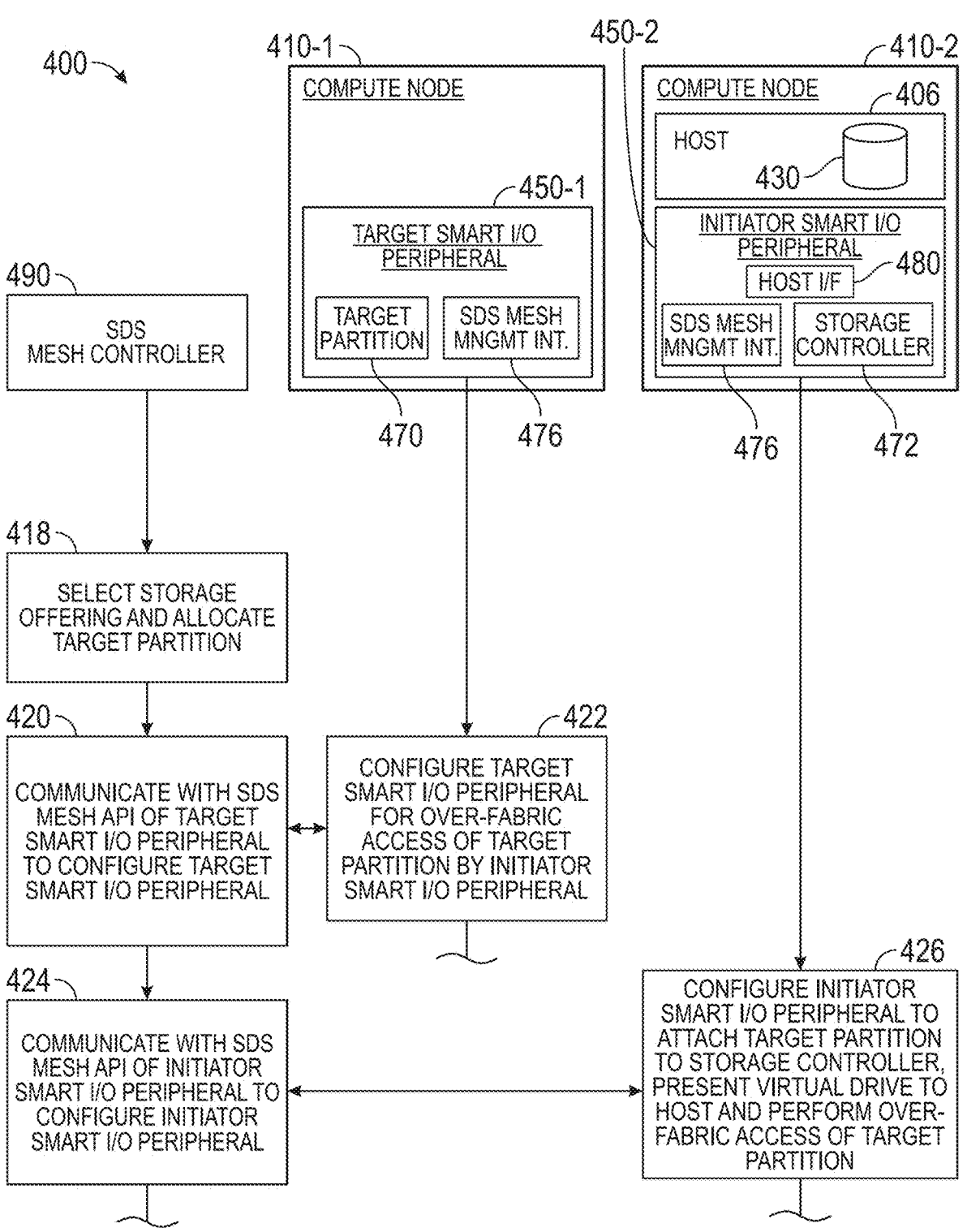
FIG. 4 is a sequence flow diagram depicting actions taken by an SDS mesh controller to configure an SDS mesh to provide storage for a virtual drive, according to an example implementation.

The SDS mesh controller 290 communicates with the smart I/O peripherals 250 via network connections 291 for purposes of automatically discovering all storage offerings and for purposes of configuring the smart I/O peripherals 250. An example sequence flow depicting storage offering discovery is described below in connection with FIG. 5. Still referring to FIG. 2, based on the discovered storage offerings, the SDS mesh controller 290 manages an available pool 283 of available physical storage. The pool 283 of available physical storage includes entries 284 (offerings). Each entry 284 corresponds to a particular storage offering discovered by the SDS mesh controller 290, and each entry 284 contains data that represents one or multiple attributes of the corresponding storage offering. The SDS mesh controller 290 may receive a number of SDS mesh allocation requests 294, which, when processed by the SDS mesh controller 290, collectively define the SDS mesh. The SDS mesh controller 290, for a given SDS mesh allocation request 294, identifies (if available) a particular storage offering 284 that satisfies the criteria specified by the request 294. From the identified storage offering 284, the SDS mesh controller 290 derives the target partition (corresponding to all or part of the partition corresponding to the storage offering 284), and the SDS mesh controller 290 then configures the corresponding smart I/O peripheral(s) to allocate the physical storage for the virtual drive 230. An example sequence flow depicting the configuration, by an SDS mesh controller, of an initiator smart I/O peripheral and a target smart I/O peripheral (for the case where an over-fabric transport is involved) is depicted in FIG. 4 and described below.

Figure 3:
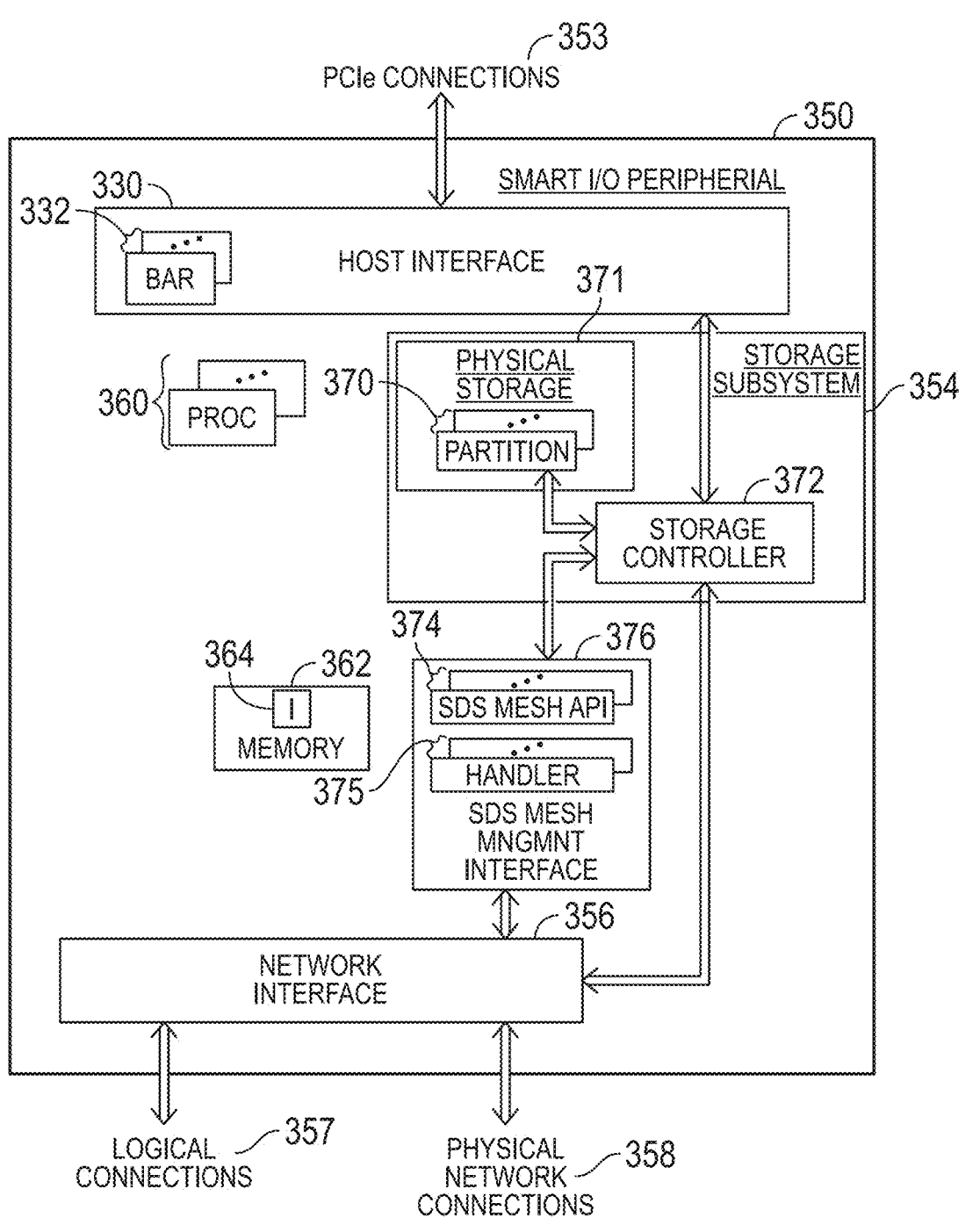
FIG. 3 is a block diagram of a smart I/O peripheral according to an example implementation.

FIG. 3 depicts a block diagram of a smart I/O peripheral 350 in accordance with example implementations. The smart I/O peripheral 150 (FIG. 1) and the smart I/O peripheral 250 (FIG. 2) are examples of the smart I/O peripheral 350.

The smart I/O peripheral 350 includes a storage subsystem 354 (e.g., an NVMe subsystem) that includes physical storage 371 and one or multiple storage controllers 372 (e.g., NVMe controllers). The physical storage 371 may be associated with one or multiple partitions 370 (e.g., NVMe namespaces). Some of the partitions 370 may correspond to target partitions that are part of an SDS mesh and are attached to respective smart I/O peripheral storage controllers (e.g., storage controller(s) 372 of the smart I/O peripheral 350 and storage controller(s) of other smart I/O peripheral(s)).

The smart I/O peripheral 350 further includes a network interface 356. The network interface 356 forms logical connections 357 and physical network connections 358 with network fabric (e.g., the network fabric 180 of FIG. 1). The network interface 356 may be configured to be an endpoint for NVMe over-fabric communications with other smart I/O peripherals of the SDS mesh.

A host interface 330 of the smart I/O peripheral 350 communicates with a host via PCI connections 353. The host interface 330 includes base address registers (BARs) 332. The BARs 332 are in the PCI configuration space and allow the creation of physical functions for the smart I/O peripheral 350. A physical function corresponds to a PCI device, which is discoverable by the host. A BAR 332 can be used to hold various memory addresses for a PCI device. In an example, a BAR 332 defines a physical function corresponding to a PCI device, and after discovery, the BAR 332 sets forth the size of the system memory space containing the submission and completion queues for the PCI device.

In an example, the BARs 332 define physical functions that correspond to respective virtual drives (e.g., the virtual drives 130 of FIG. 1 or the virtual drives 230 of FIG. 2). In another example, a given BAR 332 defines virtual functions that correspond to respective virtual drives. More specifically, in accordance with example implementations, the virtual functions are according to PCIe single root I/O virtualization (SR-IOV), as defined by a PCI Special Interest Group (SIG), which is a community that defines standards (including the SR-IOV Specification) relating to PCIe. SR-IOV allows a PCI device to present itself to a host as multiple distinct virtual devices. A physical function provides control over the creation and allocation of virtual functions. A "physical function," in the context that is used herein, refers to a PCI device that includes SR-IOV capabilities (e.g., enabling virtualization and exposing virtual functions). Physical Functions are discovered, managed, and configured as normal PCI devices. A "virtual function," in the context that is used herein, refers to a virtual, or abstracted, PCI device that has capabilities limited to I/O. A virtual function has its own configuration space, and in accordance with example implementations, the virtual functions share the smart I/O peripheral's underlying hardware and PCIe interface.

In accordance with example implementations, the smart I/O peripheral 350 includes an SDS mesh management interface 376. The SDS mesh management interface 376 includes SDS mesh APIs 374. The SDS mesh APIs 174 of FIG. 1 are examples of the SDS mesh APIs 374. The SDS mesh management interface 376 includes action handlers 375 for respective SDS mesh APIs 374. An SDS mesh controller (e.g., the SDS mesh controller 190 of FIG. 1 or the SDS mesh controller 290 of FIG. 2) makes API calls to the SDS mesh APIs 374 for purposes of initiating tasks related to orchestrating the SDS mesh. In examples, these tasks include discovering storage offerings provided by the smart I/O peripheral 350, configuring the smart I/O peripheral 350 to contribute physical storage to the SDS mesh, configuring the smart I/O peripheral 350 to access physical storage provided by the SDS mesh and configuring the smart I/O peripheral 350 to present a virtual drive to a host.

In an example, an SDS mesh API 374 corresponds to storage offerings for the smart I/O peripheral 350. In an example, SDS mesh API 374 and a corresponding action handler 375 provide a mechanism to discover available storage of the smart I/O peripheral 350 for the SDS mesh, including attributes of the available storage, and indicate the corresponding storage offerings to the SDS mesh controller.

In another example, an SDS mesh API 374 and a corresponding action handler 375 provide a mechanism to configure the smart I/O peripheral 350 to be a target for over-fabric communications in which an initiator smart I/O peripheral accesses a target partition 370 of the smart I/O peripheral 350. In an example, the configuration sets up a port of the network interface 356 for the over-fabric communication, configures the network interface 356 to allow access by an initiator smart I/O peripheral having a specified Internet Protocol (IP) address, and configures the network interface 356 with over-fabric transport parameters.

In another example, an SDS mesh API 374 and a corresponding action handler 375 provide a mechanism to configure the smart I/O peripheral 350 to be an initiator for over-fabric communications in which the smart I/O peripheral 350 accesses a target partition that is located on a target smart I/O peripheral. In an example, the configuration attaches the target partition to a storage controller 372, configuring the storage controller 372 with an IP address and a port of the target smart I/O peripheral, and configuring the network interface 356 with parameters for the over-fabric communication. In another example, an SDS mesh API 374 and a corresponding action handler 375 provide a mechanism to configure the host interface 330 (e.g., add a virtual function) to present a virtual drive to the host corresponding to the target partition.

In another example, an SDS mesh API 374 and a corresponding action handler 375 provide a mechanism to configure the smart I/O peripheral 350 for the case in which the smart I/O peripheral 350 contains the target partition and presents the corresponding virtual drive to the host. In an example, the configuration includes attaching the target partition to a storage controller 372. In an example, the configuration includes subdividing a current partition 370 to create the target partition. In another example, the target partition corresponds to an entire existing partition 370. In another example, an SDS mesh API 374 and a corresponding action handler 375 provide a mechanism to configure the host interface 330 (e.g., add a virtual function) to present a virtual drive to the host corresponding to the target partition.

In accordance with example implementations, one or multiple components of the smart I/O peripheral 350, such as the SDS mesh management interface 376 and the storage controller(s) 372 may be implemented by one or multiple hardware processors 360 executing machine-readable instructions, such as machine-readable instructions 364 that are stored in a memory 362 of the smart I/O peripheral 350. In another example, a hardware processor 360 may correspond to a dedicated hardware circuit that does not execute machine-readable instructions, and the dedicated hardware circuit provides one or multiple functions for one or multiple components of the smart I/O peripheral 350. In another example, a particular component of the smart I/O peripheral 350 or a function of the component may be formed from a combination of dedicated hardware and executed machine-readable instructions.

FIG. 4 is a sequence flow diagram 400 depicting actions taken by an SDS mesh controller 490 to configure a target smart I/O peripheral 450-1 and an initiator smart I/O peripheral 450-2 to share storage, in accordance with example implementations. The smart I/O peripheral 150 (FIG. 1), the smart I/O peripheral 250 (FIG. 2), and the smart I/O peripheral 350 (FIG. 3) are examples of the target smart I/O peripheral 450-1 and the initiator smart I/O peripheral 450-2. The SDS mesh controller 190 (FIG. 1) and the SDS mesh controller 290 (FIG. 2) are examples of the SDS mesh controller 490.

Referring to FIG. 4, the target smart I/O peripheral 450-1 is part of a compute node 410-1 and includes a target partition 470 (e.g., an NVMe namespace). The target smart I/O peripheral 450-1 also has an SDS mesh management interface 476. The SDS mesh management interface 376 (FIG. 3) is an example of the SDS mesh management interface 476. The initiator smart I/O peripheral 450-2 is part of a compute node 410-2 that also includes a host 406. The initiator smart I/O peripheral 450-2 includes a host interface 480 that presents (e.g., via a virtual function) a virtual drive 430 to the host 406. The initiator smart I/O peripheral 450-2 includes an SDS mesh management interface 476 and a storage controller 472 (e.g., an NVMe controller).

As depicted at 418, the SDS mesh controller 490 selects a particular storage offering and allocates a partition of the storage offering, which corresponds to the target partition 470. The selection of the storage offering may be based on a number of different factors, and in particular, satisfies the criteria set forth in a corresponding SDS mesh allocation request. As depicted at 420, the SDS mesh controller 490 communicates with one or multiple SDS mesh APIs (e.g., calls SDS mesh APIs of the SDS mesh management interface 476) of the target smart I/O peripheral 450-1 for purposes of configuring the target smart I/O peripheral 450-1. As depicted at 422, this configuration includes the SDS mesh controller 490 configuring the smart I/O peripheral 450-1 for over-fabric access of the target partition 470 by the initiator smart I/O peripheral 450-2. In an example, the configuration sets up a port of the target smart I/O peripheral 450-1 for the over-fabric communication, configures the target smart I/O peripheral 450-1 to allow access by an IP address corresponding to the initiator smart I/O peripheral 450-2, and configures the target smart I/O peripheral 450-1 with over-fabric transport parameters.

The SDS mesh controller 490 also, as depicted at 424, communicates with one or multiple SDS mesh APIs (e.g., calls multiple SDS mesh APIs of the SDS mesh management interface 476) of the initiator smart I/O peripheral 450-2 for purposes of configuring the initiator smart I/O peripheral 450-2. As depicted at 426, the configuration includes configuring the initiator smart I/O peripheral 450-2 to attach the target partition 470 to the storage controller 472, present the virtual drive 430 to the host 406 and perform over-fabric access of the target partition 470. In an example, the configuration includes configuring the storage controller 472 with an IP address and a port of the target smart I/O peripheral 450-1, and configuring the initiator smart I/O peripheral 450-2 with parameters for the over-fabric communication. In an example, the configuration includes configuring the host interface 480 to add a virtual function corresponding to the virtual drive 430.

Figure 5:
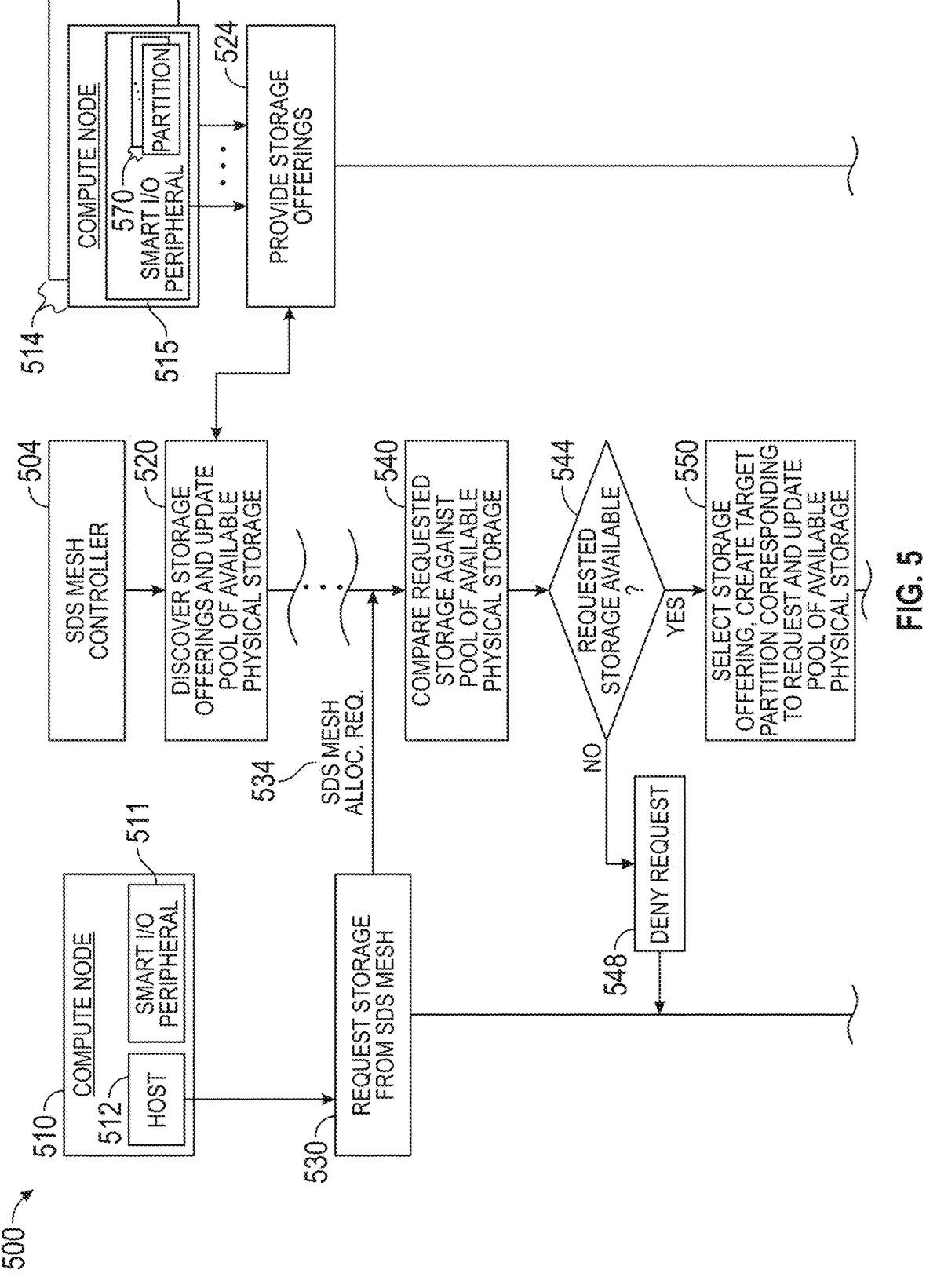
FIG. 5 is a sequence flow diagram depicting actions taken by an SDS mesh controller to discover smart I/O peripheral-provided storage offerings and respond to an SDS mesh allocation request, according to an example implementation.

FIG. 5 is a sequence flow diagram 500 depicting actions taken by an SDS mesh controller 504 for purposes of managing storage offerings and responding to a storage allocation request, in accordance with example implementations. For this example, a compute node 510 requests storage from the SDS mesh, and the SDS mesh controller 504 allocates the storage for the compute node 510 and from the SDS mesh based on discovered storage offerings. The compute nodes 110 (FIGS. 1) and 210 (FIG. 2) are examples of the compute node 510.

More specifically, as depicted at 520, the SDS mesh controller 504 discovers storage offerings that are provided (as depicted at 524) by various compute nodes 514 of the SDS mesh. The compute nodes 110 (FIGS. 1) and 210 (FIG. 2) are examples of the compute node 514. Although FIG. 5 depicts the requesting compute node 510 being separate from the compute nodes 514 that provide the storage offerings, the compute node 510 may, in another example, provide one or multiple storage offerings, and one of these storage offerings is selected by the SDS mesh controller 504. As depicted in FIG. 5, in general, the compute nodes 514 include respective smart I/O peripherals 515, with each smart I/O peripheral including one or multiple partitions 517 that correspond to the storage offerings.

As depicted at 530, the compute node 510 requests storage from the SDS mesh and correspondingly, a host 512 of the compute node 510 submits an SDS mesh allocation request 534 to the SDS mesh controller 504. In another example, an entity (e.g., a remote management node) may submit the SDS mesh allocation request 534 on behalf of the host 512. Responsive to the SDS mesh allocation request 534, the SDS mesh controller 504 compares the requested storage (e.g., in terms of the attributes of the requested storage) against the pool of available physical storage. As depicted at decision block 544, the SDS mesh controller 504 may determine that none of the storage offerings satisfy the criteria that are specified by the SDS storage mesh allocation request 534, and correspondingly, the SDS mesh controller 504 sends a deny request indication 548 to the compute node 510. If, however, the requested storage is available, then, as depicted at 550, the SDS mesh controller 504 selects a storage offering, creates a target partition from the pool of available physical storage corresponding to the attributes of the SDS mesh allocation request 534, and updates the pool of available physical storage. The SDS mesh controller 504 may then proceed to configure the smart I/O peripheral 515 (the target) corresponding to the selected storage offering and configure the smart I/O peripheral 511 (the initiator), as described herein.

Figure 6:
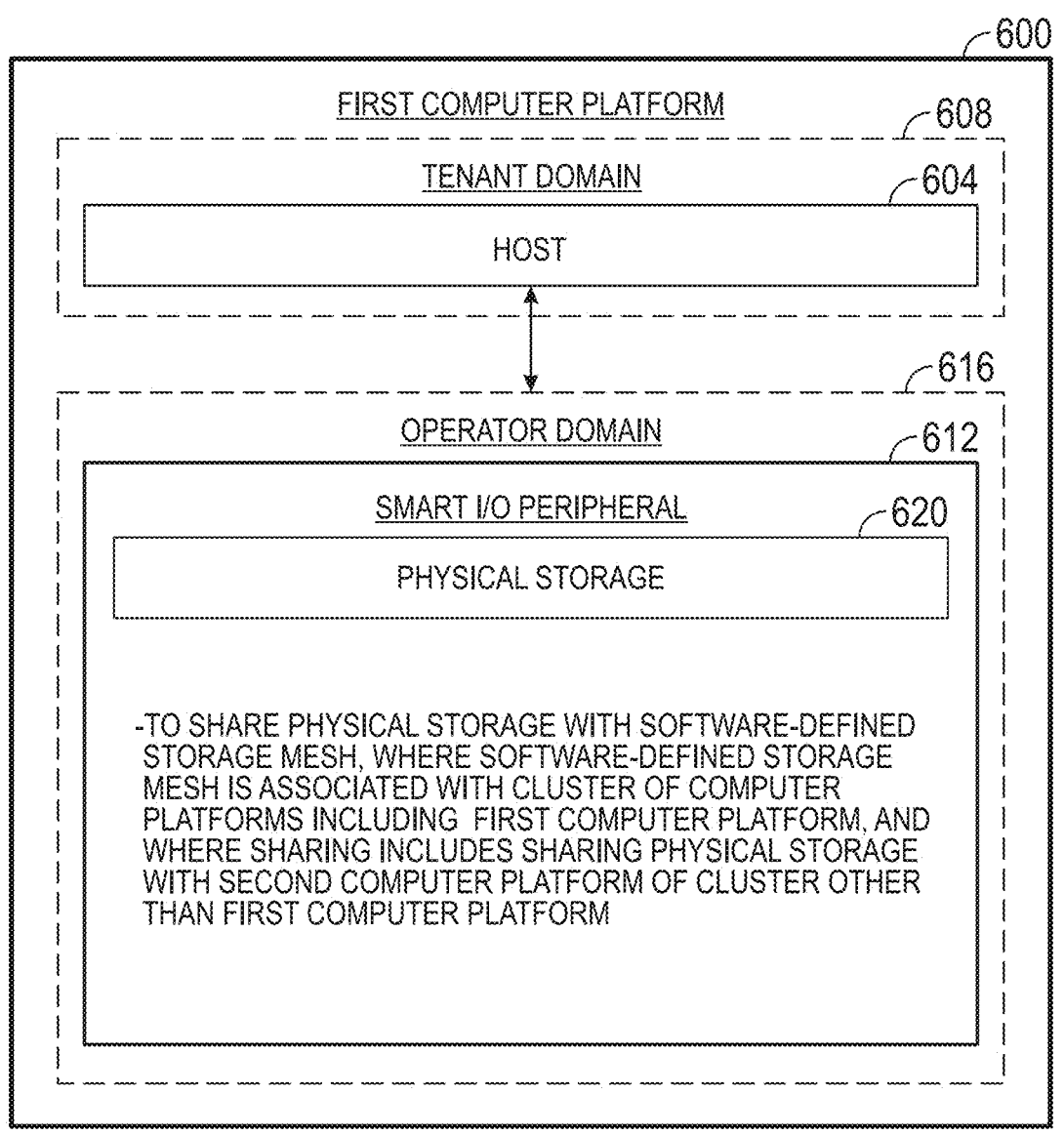
FIG. 6 is a block diagram of a computer platform having a smart I/O controller that shares physical storage with an SDS mesh, according to an example implementation.

Referring to FIG. 6, in accordance with example implementations, a computer platform includes a first computer platform 600. The first computer platform 600 includes a host 604 that is associated with a tenant domain 608 and a smart I/O peripheral 612 that is associated with an operator domain 616 that is isolated from the tenant domain 608. In examples, the first computer platform 600 is a server, such as an enclosure-based server (e.g., a blade server), a rack-based server (e.g., a DL server), or a tower server). In an example, the host 604 contains resources that support tenant workloads. In an example, the smart I/O peripheral 612 includes a host interface that provides a tenant workload isolation barrier separating the tenant domain 608 from the operator domain 616.

In an example, the operator domain 616 is associated with a private cloud operator. In another example, the operator domain 616 is associated with a public cloud operator. In another example, the first computer platform 600 corresponds to a set of on-premise computer platforms, and the operator domain 616 corresponds to a public cloud operator.

The smart I/O peripheral 612 includes physical storage 620 and a storage controller 624. In an example, the physical storage 620 corresponds to a non-volatile memory. In an example, the physical storage 620 is part of an NVMe subsystem.

The smart I/O peripheral 612 shares the physical storage 620 with a software-defined storage mesh. The software-defined storage mesh is associated with a cluster of computer platforms including the first computer platform 600. Sharing the physical storage 620 with the software-defined storage mesh includes sharing the physical storage 620 with a second computer platform of the cluster. In an example, the smart I/O peripheral 612 is a target and a smart I/O peripheral of the second computer platform is an initiator for sharing of the physical storage via an over-fabric transport. In an example, the smart I/O peripheral 612 and a smart I/O peripheral of the second computer platform communicate based on an NVMe base protocol model in conjunction with an NVMe transport model. In an example, the sharing of the physical storage 620 corresponds to the sharing of a partition of the physical storage 620. In an example, the partition is an NVMe namespace.

In an example, the smart I/O peripheral 612 includes APIs that are called by a storage mesh controller for purposes of performing tasks to orchestrate the sharing of the physical storage 620. In an example, the tasks include configuring the smart I/O peripheral 612 to be a target for over-fabric access, by a smart I/O peripheral of the second computer, of a target partition of the physical storage 620. In an example, the over-fabric access may use an RDMA transport (e.g., RDMA over an Infiniband network, RDMA over TCP and ROCe). In an example, the over-fabric access may use a TCP transport. In an example, the over-fabric access may use a FibreChannel transport. In an example, an API of the smart I/O peripheral 612 is called by the storage mesh controller for purposes of orchestrating the sharing of the physical storage 620 with a third computer platform. In an example, an APIs of the smart I/O peripheral 612 is called by the storage mesh controller for purposes of discovering a storage offering by the smart I/O peripheral 612 corresponding to a partition of the physical storage 620.

Referring to FIG. 7, in accordance with example implementations, a system 700 includes a first server 704, a second server 730 and a storage mesh controller 740. In an example, the storage mesh controller 740 is associated with an SDS mesh service that is provided by a cloud operator. In an example, the SDS mesh service corresponds to an "as-a-Service" model. In an example, the first 704 or second server 730 is an enclosure-based server (e.g., a blade server), a rack-based server (e.g., a DL server), or a tower server.

The first server 704 includes a first host 708 and a first smart I/O peripheral 712. The first smart I/O peripheral 712 includes a physical storage device 716. The second server 730 includes a second host 734 and a second smart I/O peripheral 738. The second smart I/O peripheral includes a storage controller 720. In an example, a smart I/O peripheral provides one or multiple functions for its respective host, which, in legacy architectures were controlled by the host. In an example, a smart I/O peripheral provides backend I/O services. In an example, the backend I/O services are non-transparent services, such as hypervisor virtual switch off-loading services. In another example, the backend I/O services are transparent services, such as encryption services, compression services, packet processing services, overlay network access services and firewall-based network protection services. In an example, a smart I/O peripheral communicates with its host via a PCIe bus. In an example, a smart I/O peripheral includes a host interface that provides a tenant workload isolation barrier. In an example, a smart I/O peripheral includes a host interface that provides functions (e.g., physical functions and virtual functions) that appear as PCIe devices to the host.

In an example, the first host 708 and the second host 734 may be part of a tenant domain, and the first smart I/O peripheral 712 and the second smart peripheral 738 may be part of an operator domain. In an example, the first host 708 and the second host 734 may be associated with tenant workloads. In an example, the physical storage 716 corresponds to a non-volatile memory. In an example, the physical storage 716 is part of an NVMe subsystem.

The storage mesh controller 740, responsive to a storage mesh allocation request that is associated with the second host 734, identifies a partition of the physical storage 716 and communicates with the first smart I/O peripheral 712 and the second smart I/O peripheral 738 to configure sharing of the partition with the second smart I/O peripheral 738. In an example, the partition is an NVMe namespace. In an example, the storage controller 720 is an NVMe controller.

Configuring the sharing configuring the second smart I/O peripheral 738 to attach the partition to the storage controller 720 and configuring the second smart I/O peripheral 738 to associate the partition with a virtual storage device of the second host 734.

In an example, the smart I/O peripherals 712 and 738 include APIs that are called by a storage mesh controller 740 for purposes of performing tasks to orchestrate the sharing of the partition. In an example, the tasks include configuring the smart I/O peripheral 712 to be a target and configuring the smart I/O peripheral 738 to be an initiator for over-fabric communication. In examples, the over-fabric communication may use an RDMA transport, a TCP transport or a FibreChannel transport. In an example, the over-fabric communication may be associated with an NVMe base protocol model in conjunction with an NVMe PCIe transport model.

Referring to FIG. 8, in accordance with example implementations, a technique 800 includes configuring, by a storage mesh controller, a plurality of computer platforms to associate the plurality of computer platforms with a software-defined storage mesh. In an example, the storage mesh controller may be provided by a cloud operator according to an as-a-Service model. In In examples, the computer platforms are servers, such as an enclosure-based servers (e.g., blade servers), rack-based servers (e.g., a DL server), tower servers, or a combination of the foregoing.

The technique 800 includes, pursuant to (block 808), sharing the storage among the plurality of computer platforms using the software-defined storage mesh. The sharing includes a first smart I/O peripheral of a first computer platform communicating with a second smart I/O peripheral of a second computer platform to share a given unit of physical storage of the second smart I/O peripheral with the first computer platform.

In an example, the computer platforms host tenant workloads. In an example, the first smart I/O peripheral and the second smart I/O peripheral include respective host interfaces that provides tenant workload isolation barriers. In an example, the first smart I/O peripheral includes a host interface that presents, to a host of the first computer platform, a virtual drive corresponding to the unit of physical storage. In an example, the host interface of the first smart I/O peripheral is associated with a physical function or a virtual function that presents the virtual drive as a PCIe device.

In an example, communicating with the first smart I/O peripheral and the second smart I/O peripheral includes the storage mesh controller calling APIs of the first and second smart I/O peripherals. In an example, communicating with the first smart I/O peripheral includes the storage mesh controller calling an API of the first smart I/O controller to configure the first smart I/O peripheral to present, to a host of the first computer platform, a virtual drive corresponding to a partition of the unit of physical storage. In an example, communicating with the first smart I/O peripheral includes the storage mesh controller calling an API of the first smart I/O controller to configure the first smart I/O peripheral to communicate with the second smart I/O peripheral using an over-fabric transport. In an example, communicating with the second smart I/O peripheral includes the storage mesh controller calling an API of the second smart I/O controller to configure the second smart I/O peripheral to communicate with the first smart I/O peripheral using an over-fabric transport. In an example, communicating with the second smart I/O peripheral includes the storage mesh controller calling an API of the second smart I/O controller to attach a storage controller of the second smart I/O peripheral to a partition of the unit of storage.

In accordance with example implementations, the given unit of physical storage corresponds to a target partition. The sharing includes allocating, by the storage mesh controller, a collection of logical block addresses corresponding to the target partition; and communicating, by the storage mesh controller, with the first smart I/O peripheral to attach the target partition to a storage controller of the first smart I/O peripheral. Among its potential benefits, the software-defined storage mesh takes advantage of existing smart I/O peripheral-based storage, which results in a smaller energy footprint than a dedicated storage system, and avoids the costs and complexities associated with a dedicated storage system.

In accordance with example implementations, the sharing further includes communicating, by the storage mesh controller, with the first smart I/O peripheral to configure the storage controller to access the target partition using an over-fabric transport. Among its potential benefits, the software-defined storage mesh takes advantage of existing smart I/O peripheral-based storage, which results in a smaller energy footprint than a dedicated storage system, and avoids the costs and complexities associated with a dedicated storage system.

In accordance with example implementations, the sharing further includes communicating, by the storage mesh controller, with the first smart I/O peripheral to configure the first smart I/O peripheral present a virtual drive corresponding to the target partition to a host of the first computer platform. Among its potential benefits, the software-defined storage mesh takes advantage of existing smart I/O peripheral-based storage, which results in a smaller energy footprint than a dedicated storage system, and avoids the costs and complexities associated with a dedicated storage system.

In accordance with example implementations, the second smart I/O peripheral further includes a second unit of physical storage. The second unit of physical storage corresponds to a target partition. The sharing includes communicating, by the storage mesh controller, with the second smart I/O peripheral to cause the second smart I/O peripheral to present a virtual drive corresponding to the target partition to a host of the second computer platform. Among its potential benefits, the software-defined storage mesh takes advantage of existing smart I/O peripheral-based storage, which results in a smaller energy footprint than a dedicated storage system, and avoids the costs and complexities associated with a dedicated storage system.

In accordance with example implementations, the smart I/O peripheral provides a storage offering to the storage mesh controller. The storage offering represents a characteristic of the physical storage available for sharing with the software-defined storage mesh. Among its potential benefits, the software-defined storage mesh takes advantage of existing smart I/O peripheral-based storage, which results in a smaller energy footprint than a dedicated storage system, and avoids the costs and complexities associated with a dedicated storage system.

In accordance with example implementations, the storage offering includes at least one of a performance criterion, a QoS criterion, an SLA criterion, a capacity criterion or a privacy criterion. Among its potential benefits, the software-defined storage mesh takes advantage of existing smart I/O peripheral-based storage, which results in a smaller energy footprint than a dedicated storage system, and avoids the costs and complexities associated with a dedicated storage system.

The detailed description set forth herein refers to the accompanying drawings. Wherever possible, the same reference numbers are used in the drawings and the foregoing description to refer to the same or similar parts. It is to be expressly understood, however, that the drawings are for the purpose of illustration and description only. While several examples are described in this document, modifications, adaptations, and other implementations are possible. Accordingly, the detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

configuring, by a storage mesh controller, a plurality of computer platforms to associate the plurality of computer platforms with a software-defined storage mesh, wherein the plurality of computer platforms comprises a first computer platform and a second computer platform physically separate from the first computer platform, wherein the first computer platform comprises a first host and a first smart input/output (I/O) peripheral, wherein the first smart I/O peripheral to physically connect the first computer platform to a network fabric, wherein the second computer platform comprises a second host and a second smart I/O peripheral, and wherein the second smart I/O peripheral to physically connect the second computer platform to the network fabric; and sharing storage among the plurality of computer platforms using the software-defined storage mesh, wherein the sharing comprises:

the first smart I/O peripheral communicating with the second smart I/O peripheral via the network fabric to share a given unit of physical storage of the second smart I/O peripheral with the first computer platform; and the first smart I/O peripheral abstracting the given unit of storage to present, to the first host, a virtual unit of storage corresponding to the given unit of storage.

2. The method of claim 1, wherein:

the given unit of physical storage corresponds to a target partition; and the sharing comprises:

allocating, by the storage mesh controller, a collection of logical block addresses corresponding to the target partition; and communicating, by the storage mesh controller, with the first smart I/O peripheral to attach the target partition to a storage controller of the first smart I/O peripheral.

3. The method of claim 2, wherein the sharing further comprises:

communicating, by the storage mesh controller, with the first smart I/O peripheral to configure the storage controller to access the target partition using an over-fabric transport.

4. The method of claim 3, wherein the virtual unit of storage comprises a virtual drive corresponding to the target partition, and the sharing further comprises:

communicating, by the storage mesh controller, with the first smart I/O peripheral to configure the first smart I/O peripheral present the virtual drive.

5. The method of claim 1, wherein:

the second smart I/O peripheral further comprises a second unit of physical storage other than the given unit of physical storage;

the second unit of physical storage corresponds to a target partition; and the sharing further comprises communicating, by the storage mesh controller, with the second smart I/O peripheral to cause the second smart I/O peripheral to present a virtual drive corresponding to the target partition to a host of the second computer platform.

6. The method of claim 1, wherein:

the plurality of computer platforms further comprises a third computer platform;

the second smart I/O peripheral further comprises a second unit of physical storage other than the given unit of physical storage;

the second unit of physical storage corresponds to a target partition; and the sharing further comprises:

allocating, by the storage mesh controller, a collection of logical block addresses corresponding to the target partition; and communicating, by the storage mesh controller, with the third smart I/O peripheral to attach the target partition to a storage controller of the third smart I/O peripheral.

7. A first computer platform comprising:

a host associated with a tenant domain; and a smart input/output (I/O) peripheral associated with an operator domain isolated from the tenant domain, and wherein:

the smart I/O peripheral comprises physical storage;

the smart I/O peripheral to physically connect the first computer platform to a network fabric;

the smart I/O peripheral to provide a backend I/O service for the host;

the smart I/O peripheral to share the physical storage with a software-defined storage mesh, wherein the software-defined storage mesh is associated with a cluster of computer platforms including the first computer platform, and wherein the sharing comprises the smart I/O peripheral communicating, via the network fabric, with a second computer platform of the cluster other than the first computer platform to share the physical storage with the second computer platform.

8. The first computer platform of claim 7, wherein:

the smart I/O peripheral to communicate via an over-fabric transport with a storage controller of a smart I/O peripheral of the second computer platform to share the physical storage.

9. The first computer platform of claim 7, wherein the smart I/O peripheral to provide a storage offering to a storage mesh controller of the software-defined storage mesh, wherein the storage offering represents a characteristic of the physical storage available for sharing with the software-defined storage mesh.

10. The first computer platform of claim 9, wherein the storage offering comprises at least one of a performance criterion, a quality of service (QOS) criterion, a service level agreement (SLA) criterion, a capacity criterion or a privacy criterion.

11. The first computer platform of claim 9, wherein:

the storage offering corresponds to a first partition;

the physical storage corresponds to a second partition, wherein the second partition is a subset of the first partition less than the first partition; and the storage controller to further, responsive to communication with a storage mesh controller of the software-defined storage mesh, associate the physical storage with the second partition.

12. The first computer platform of claim 11, wherein the partition corresponds to a collection of logical block addresses associated with the first storage device.

13. The first computer platform of claim 7, wherein the smart I/O peripheral to present the partition as a virtual storage device on the host.

14. A system comprising:

a first server comprising a first host and a first smart input/output (I/O) peripheral, wherein the first smart I/O peripheral includes physical storage;

a second server physically separate from the from the first server, wherein the second server comprises a second host and a second smart input/output (I/O) peripheral, and wherein the second smart I/O peripheral comprises a storage controller; and a storage mesh controller to, responsive to a first storage allocation request associated with the second host, identify a first partition of the physical storage and communicate with the first smart I/O peripheral and the second smart I/O peripheral to configure sharing of the first partition with the second smart I/O peripheral, wherein configuring sharing of the first partition comprises:

configuring the second smart I/O peripheral to attach the first partition to the storage controller; and configuring the second smart I/O peripheral to associate the first partition with a virtual storage device of the second host.

15. The system of claim 14, wherein configuring sharing of the first partition further comprises configuring the second smart I/O peripheral to access the first partition using an over-fabric transport.

16. The system of claim 15, wherein configuring sharing of the first partition further comprises:

configuring the first smart I/O peripheral to identify logical block addresses of the physical storage as corresponding to the first partition; and configuring the first smart I/O peripheral to communicate with the second smart I/O peripheral using the over-fabric transport.

17. The system of claim 14, wherein the storage mesh controller to further, responsive to a second storage allocation request associated with the first host, identify a second partition of the physical storage and communicate with the first smart I/O peripheral to associate the second partition a virtual storage device of the first host.

18. The system of claim 14, wherein the first partition corresponds to a collection of logical block addresses associated with the physical storage.

19. The system of claim 14, wherein the storage mesh controller to further:

receive a plurality of storage allocation requests to define a storage mesh corresponding to a plurality of servers, wherein the plurality of storage allocation requests includes the first storage allocation request, and wherein the plurality of servers includes the first server and the second server; and communicate with the plurality servers to allocate shared storage and local storage for the storage mesh.

20. The system of claim 14, further comprising a third server, wherein:

the third server comprises a third smart I/O peripheral;

the third smart I/O peripheral comprises physical storage; and the storage mesh controller to, responsive to a second storage allocation request associated with the second host:

identify a second partition of the physical storage of the third smart I/O peripheral; and communicate with the second smart I/O peripheral and the third smart I/O peripheral to configure sharing of the second partition with the second smart I/O peripheral.

21. The first computer platform of claim 7, wherein the backend I/O service comprises a non-transparent service or a transparent service.

22. The first computer platform of claim 21, wherein the non-transparent service comprises a hypervisor virtual switch offloading service, and wherein the transparent service comprises an encryption service, a compression service, a packet processing service, an overlay network access service or a firewall-based network protection service.

* * * * *